April 27, 1943.   R. GADDIS   2,317,853
MATERIAL DISTRIBUTING DEVICE
Filed Aug. 21, 1940   3 Sheets-Sheet 2
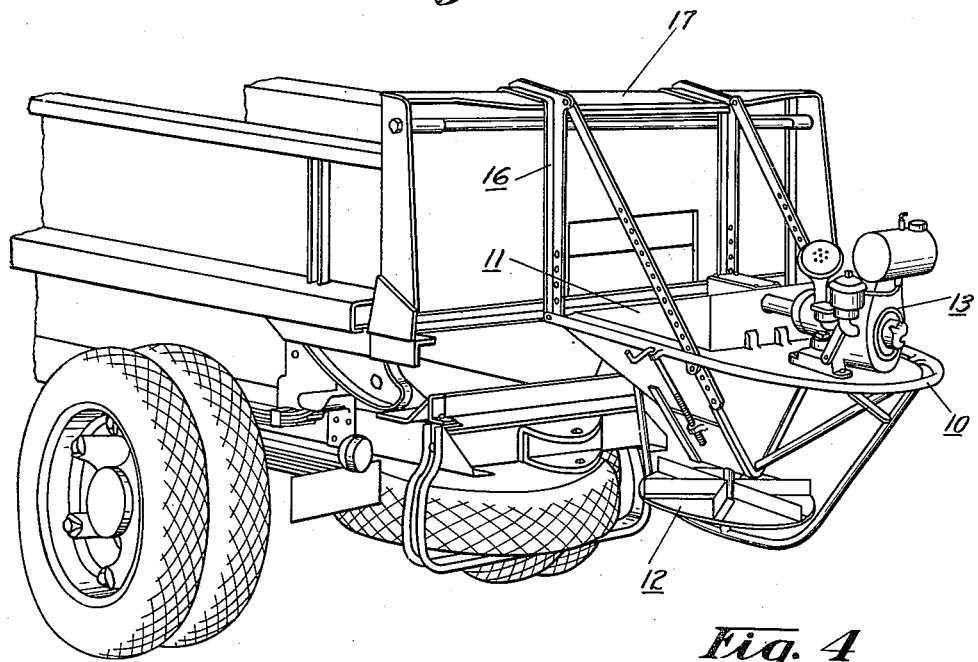
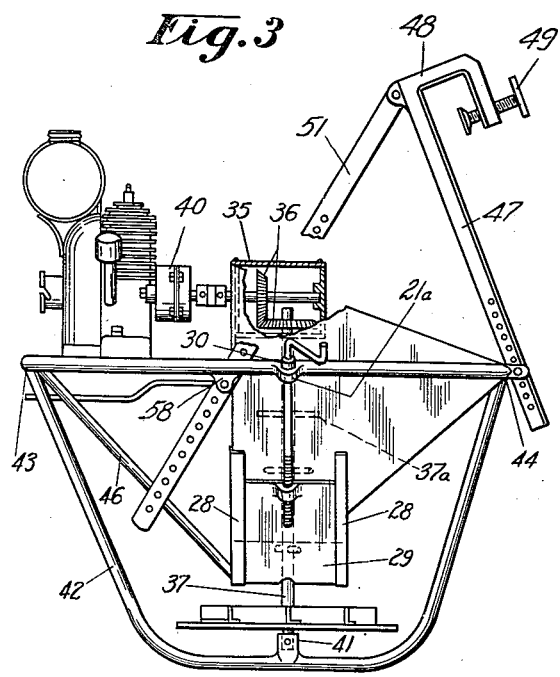
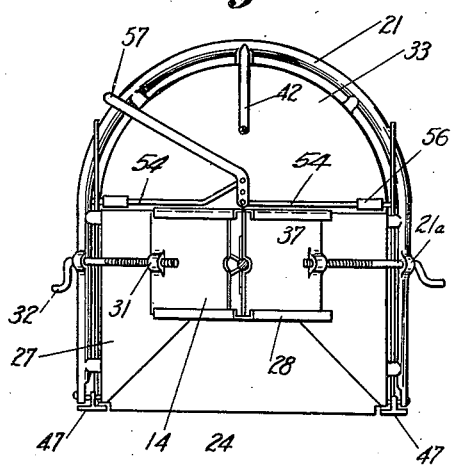
INVENTOR.
ROY GADDIS
BY Flournoy Corey
ATTORNEY.

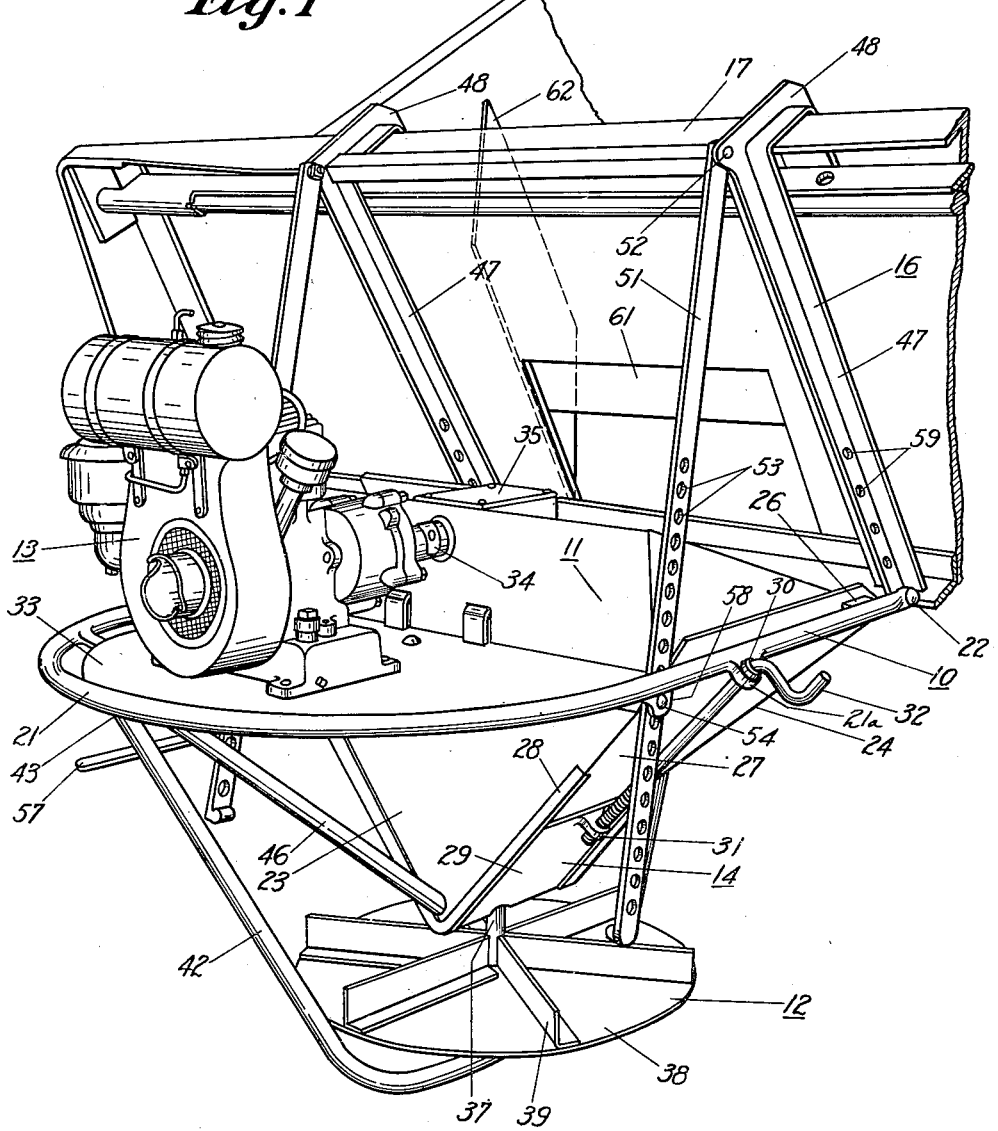

April 27, 1943.  R. GADDIS  2,317,853
MATERIAL DISTRIBUTING DEVICE
Filed Aug. 21, 1940  3 Sheets-Sheet 3
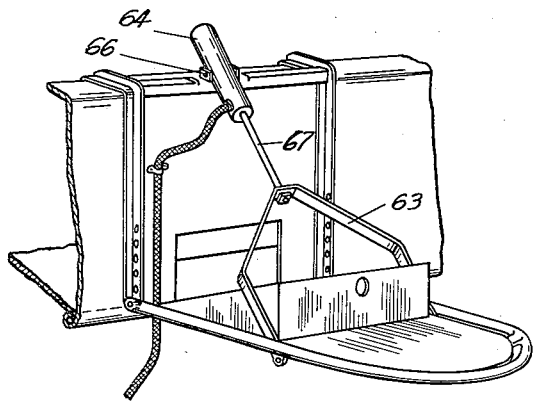
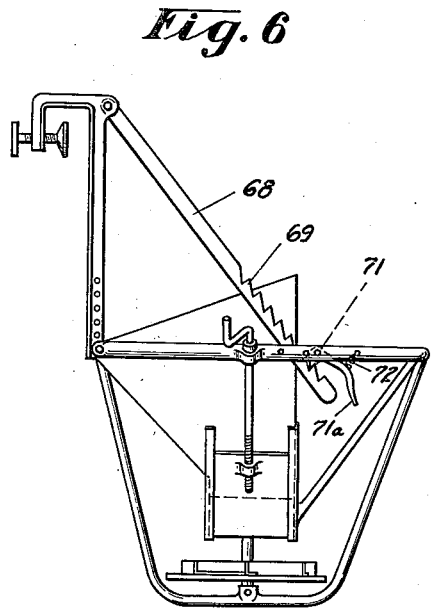
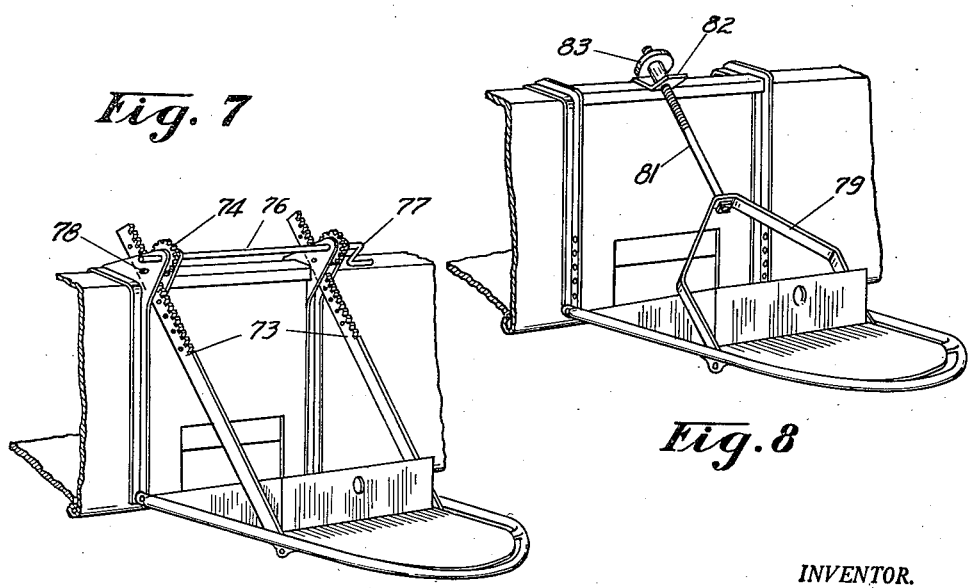
INVENTOR.
ROY GADDIS
BY Flournoy Corey.
ATTORNEY.

Patented Apr. 27, 1943

2,317,853

UNITED STATES PATENT OFFICE 2,317,853

MATERIAL DISTRIBUTING DEVICE

Roy Gaddis, Cedar Rapids, Iowa, assignor to Milver C. Erusha, Walford, Iowa

Application August 21, 1940, Serial No. 353,499

8 Claims. (Cl. 275—8)

This invention relates to material distributing or broadcasting devices and has particular relation to means for distributing or scattering sand, cinders, limestone, fertilizer and the like over roads, highways and fields.

While several mechanical devices are in use for distributing sand, cinders, limestone and like materials, most devices of this character are either fastened to the tail gate of a truck box or are built-in units requiring a special truck box.

The devices adapted to be fastened on or hung from the wagon box usually must be filled by shovelers in the wagon who raise the material over the tail gate and drop it into the hopper of the distributor. Even if two shovelers are used, it is difficult to keep the hopper filled at any but low speeds because all the material must be scooped up and lifted over the tail gate. As a result, the trucks cannot move much faster than five miles an hour.

If the sand distributing devices are "built into" the truck box, a special box is needed and the box and truck cannot be readily used for any other purpose.

It is a general object of my invention to provide an auxiliary or detachable sand spreading device which may be used with an ordinary dump truck box without the necessity for material change in the dump truck structure and yet which is constructed to take advantage of the load dumping features of such trucks to materially speed up the operation of distributing sand and like materials.

A disadvantage of devices heretofore proposed has been that they might be in proper position when the dump box is down but would be tilted to such a degree as to render the device inoperable if the dump box were raised sufficiently high to dump the load. It is another important object of my invention to provide a distributor which may be readily accommodated to and entirely operable with a tilted dump box.

Another object of my invention is to provide a device of the character described in which the direction in which the material is thrown and the relative volume in given directions may be controlled.

Another object of my invention is to provide means for preventing clogging of the hopper, for regulating and for quick and ready clearing of the discharge gates of the hopper.

Still other objects of my invention are to provide means for readily tilting the distributor with reference to its supports and for locking it in any desired position of tilt.

Another object of my invention is to provide protective means for protecting the parts of the sand distributing device, which protective means may also provide bearing mountings for the rotating parts of the sander.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

Figure 1 is a view in perspective illustrating a device constructed in accordance with my invention as it appears in operation when mounted on the rear of a dump truck.

Figure 2 is a view in perspective of the device shown in Figure 1 as it appears when the box of the dump truck is in its normal or horizontal position.

Figure 3 is a side elevational view of the device shown in Figure 1.

Figure 4 is a view of the same device, looking up at its under side.

Figure 5 is a fragmentary view in perspective of a tiltable sander frame constructed in accordance with a modified form of my invention.

Figure 6 is a partial view in side elevation of another embodiment of my invention, and Figures 7 and 8 are views in perspective of still further modified forms of my invention.

Referring now to the drawings, and particularly to Figures 1 to 4 thereof; the exemplary device illustrated comprises, in general, a main frame 10, a hopper 11, a material broadcasting disc 12, driving means for the disc, such as the gasoline engine 13, feed regulating means indicated generally at 14, and an adjustable hanger frame 16 for mounting the device on the tail gate 17 of a dump truck on the like.

The main frame 10 may be constructed of tubing or the like, as shown, and includes a rim or outer frame 21 preferably semi-cylindrical in form. This main frame is hingedly connected, as at 22, on a hanger frame 16, as will be hereinafter more particularly described.

The hopper 11 is generally V-shaped in transverse elevation, as shown at the rear wall 23 which is preferably vertical.

The upper panel 24, at least, of the forward wall of the hopper is sloped forwardly, and the hopper is mounted, as by small spacer members 26, between the forward ends of the frame rim 21 so as to position the forward edge of the hopper substantially in line with the frame supporting pivots 22.

The lower ends of the side panels 27 are cut away to provide openings (not shown) for material to feed through. The forward and rear panels 23 and 24 respectively are reinforced by angle corner members 28 in which feed regulating plates or gates 29 are slidably received. These plates are preferably adapted to contact each other, when adjusted to their lowermost positions, so as to entirely close the hopper.

A lug 31 is welded or otherwise attached to each gate, and an operating crank 32, rotatably received in an ear 21a on the main frame, is threadedly received in each lug. The shafts of the cranks 32 each have a collar 30 thereon which rests on the ears 21a to thus support the gates from the main frame. Operation of these cranks raises or lowers the gates 29, as desired, to regulate the opening between the gates to any desired width. Calcium chloride, for instance, flows freely and only a small opening is necessary. Sand requires a larger opening and cinders a still larger opening. If a lump or clod clogs the opening, one or both of the cranks may be pulled upwardly, the shafts of the cranks sliding through the ears 21a, to permit the clod to pass through the discharge opening. Of course the gates may be just as quickly returned to their former positions to regulate the flow of material onto the distributor disc.

A plate 33 is supported within the rear semi-cylindrical end of the frame rim 21, and the gas engine or other driving means 13 is mounted on this plate. The output shaft of this driving means is connected by a flexible coupling 34 to a gear box 35 in which bevel gears 36, best illustrated in Figure 3, transmit motion to a vertically disposed distributor shaft 37.

The bevel gears 36 illustrated may or may not be of the reduction type, since the gasoline engine shown employs an integral speed reduction gear unit 40. The distributor shaft may, quite apparently, be driven from the engine through a single bevel reduction gearing unit replacing the gear box 35.

A plurality of agitator rods 37a are attached to the distributor shaft at spaced intervals to agitate the material within the hopper, break up any damp clods, and thus prevent clogging. The distributor disc 12, which includes the circular plate 38 and a plurality of substantially radial fins 39, is mounted on the distributor shaft near the lower end thereof. A bearing support 41 for the lower end of this shaft is mounted upon a "skeg" or tubular member 42 attached, at its upper ends, to the main frame as at 43 and 44 and formed in such a manner as to extend below and clear the distributor disc.

An auxiliary brace member 46 extends from the main frame to the lower end of the rear wall of the hopper.

The hanger frame 16 preferably includes a pair of bars 47—47 of T iron or the like formed at their upper ends to provide "C" clamps 48—48. Hand screws 49 are provided in these members to tightly clamp the hanger bars in position on the tail gate 17 of the truck box.

Adjustable supporting and bracing bars 51 for supporting the rear end of the main frame may be pivotally connected, as at 52, near the upper ends of the hanger bars 47, and these bars may be provided with a plurality of openings 53 throughout their lower positions, in which openings locking rods 54 may be selectively engaged.

These locking rods, best shown in Figure 4, are slidably engaged in tubular guide members 56 mounted on the underside of the mounting plate 33. A lever arm 57, swingably mounted on the underside of the mounting plate, is operatively connected with the locking rods at their inner ends so that when the lever arm is moved in one direction, the locking rods are disengaged from the bracing bars to permit the frame to be raised or lowered.

Spring members (not shown) are enclosed in the tubular guide members 56 to bias the locking rods outwardly into locking position. When in such locking position, the outer end of each locking rod is preferably supported in a lug 58 welded to the main frame adjacent each bracing bar.

The hanger bars 47, previously described, are provided with a plurality of openings 59 to permit them to be adapted to truck boxes of various depths.

In use, a device such as I have described, is hung on the tail gate of a vehicle and the main frame 10 adjusted on the hanger frame so as to dispose the forward edge of the hopper 11 on a level with or slightly below the rear edge of the floor of the wagon box. It is desirable that the main frame 10 be supported in substantially horizontal position, not only when in use with the box tilted, but when the box is in its normal lowered position.

When the vehicle box, filled with sand or the like, is being tilted, preparatory to use of the sander, an operator may release the locking rods, by means of the lever 57, and then support the main frame 10, at its rear end, in a horizontal position, until the box is in the desired tilted position. The locking rods are then released to lock the frame in horizontal position.

A gate 61, which may be provided in the tail gate of the vehicle, may be opened to any desired extent to permit sand or other material to feed directly into the hopper without any necessity for more than a minimum of shoveling.

Guide plates 62 (Figure 1) may, if desired, be provided in the rear end of the vehicle box to entirely eliminate all handling and shoveling.

The distributor may be tilted by hydraulic or other mechanical means by an operator in the box. I have illustrated several such representative tilting mechanisms in Figures 5 to 8 inclusive.

In Figure 5, the main frame 10 is supported by a bail 63. A hydraulic hoist 64, which may be hand operated or which may be connected to a motor operated fluid pump (not shown), is pivotally connected as at 66 to the upper portion of the hanger frame 16, and the piston or drive rod 67 of the hoist secured to the bail 63.

The structure illustrated in Figure 6 includes a pair of bracing and supporting bars 68 provided with ratchet teeth 69. A pawl 71 pivotally mounted on the main frame is held in engagement with the ratchet teeth by a compression spring 72. The main frame may be readily lifted upwardly and will be supported by the ratchet pawl 71 in lifted position until the pawl is released by a handle 71a.

In the structure illustrated in Figure 7, the supporting and bracing bars take the form of racks 73 with which pinions 74 are engaged.

These pinions 74 may be mounted on a cross shaft 76 which may be manually rotated by means of a crank 77. The racks may be locked in any desired position by pins 78 inserted through aligned openings in the pinion supporting frame.

In the device shown in Figure 8, the frame is supported by a bail 79, a threaded supporting rod 81, a bracket 82 attached to the hanger frame, and a hand wheel 83 engaged on the threaded rod 81.

It is obvious, then, that various means may be employed for tilting the distributor with reference to the truck box while the latter is being raised and lowered, and that such tilting may be effected from within the truck box or from the ground behind the box and that power or mechanical means may be employed.

It is possible, with a device such as I have described, to spread material evenly, over a broad surface The feed gates may be so adjusted as to feed more or less material and to direct that material onto one side or the other of the distributor disc. In this way, full control is had over the distribution.

If used in sanding highways, sand may be fed onto the disc so as to be thrown farther to the left side of the vehicle than to the right side or vice versa. The speed and rate of feed of the device may be so regulated as to cause a large portion of the material to be thrown forwardly under the wheels, and thus insure traction for the sanding truck.

The means which I have devised for mounting a distributor on a dump-box vehicle makes it possible to operate at much higher speeds. In fact, the capacity of such a device is mostly dependent upon the speed at which the vehicle may be safely operated.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a material distributing device including a main frame, a hopper mounted therein, distributing means and driving means supported by the main frame, means for mounting the main frame on the tail gate of a truck box, and rigid means for adjustably supporting the frame at an angle relative to the tail gate of the truck box.

2. In a material distributing device, a main frame distributor and driving means mounted thereon, hanger means engageable on the tail gate of a vehicle box, means for hingedly connecting the main frame to the hanger frame, and bracket means for adjustably connecting the main frame and the hanger frame at points spaced from the hinge connecting means whereby the main frame may be supported in operating position by the vehicle box irrespective of the position of said box relative to the horizontal.

3. In a material distributing device, for use in connection with a tiltable vehicle box, a hanger frame engageable on the tail gate of a vehicle box, a main frame, a hopper in the main frame, means for selectively and hingedly connecting the main frame to the hanger frame in a plurality of positions to support the hopper adjacent the lower edge of the discharge end of vehicle boxes of various depths, rigid bracket members hingedly connected to the hanger frame near its upper end, and means for selectively securing the main frame to the bracket members in a plurality of positions.

4. In a material distributing device, a pair of spaced hanger members having means thereon at their upper ends for engagement with the upper edge of the tail gate of a vehicle box, a main frame, means for selectively attaching the main frame to the hanger members at a plurality of points vertically thereof and for pivotal movement relative thereto, a pair of rigid supporting and bracing arms pivotally secured to the hanger members near their upper ends, and engageable at a plurality of spaced points along the said bracing members to said main frame whereby the main frame may be held rigidly in fixed position relative to the vehicle box irrespective of the position of the vehicle box relative to the horizontal, a hopper disposed within the main frame with one edge disposed substantially between the points of pivotal connection of the main frame with the hanger members, a distributor disc below the bottom of a hopper, and means for driving said distributor disc mounted upon the main frame.

5. In a material distributing device, a pair of substantially vertically extending hanger members adapted to be hooked over the upper edge of the tail gate of a vehicle dump box, a main frame pivotally and adjustably secured near the lower ends of said hanger members, a pair of bracing members pivotally attached to the hanger members near the upper ends thereof, and slidably engaged to the main frame, the said bracing members being provided with a plurality of spaced openings for reception of locking pins, a lever and pins operatively connected therewith and slidably mounted in the main frame for selective engagement in the holes in the bracing members.

6. In a material distributing device, a main frame, hanger members comprising a pair of substantially vertically extending members having means at their upper ends for engagement on the tail gate of a vehicle box, rigid adjustable members pivotally secured to the hanger members near the upper ends thereof and slidably secured to the main frame, means for locking said bracing members in any one of a plurality of positions relative to the main frame, a hopper within the main frame extending downwardly therefrom, a distributor shaft extending downwardly through the hopper and having a distributor disc on the lower end thereof immediately below the hopper, and a skid substantially U-shaped and attached at its upper ends to the main frame ahead of and behind the hopper with the lower part thereof extending below the distributor disc for protecting said distributing disc, the said skid having a bearing thereon for receiving and guiding the lower end of the distributor shaft.

7. In a material distributing device, a pair of spaced hanger members hooked at their upper ends for engagement over the upper edge of the tail gate of a vehicle box, a main frame, means for selectively and adjustably attaching the main frame to the hanger members at a plurality of positions vertically thereof and for pivotal movement relative thereto, rigid arm members extending between the said hanger members at their upper ends and said frame member at points spaced from the pivotal attaching means, said rigid arm members being pivotally secured at one end and adjustably secured near the other end, means for locking said adjustable attaching means in any one of the plurality of positions, a hopper disposed within and substantially below the main frame and substantially between the points of connection of the main frame with the hanger members, driving means mounted on and above the main frame rearwardly of the hopper, a gear case within the upper part of the hopper having the gears thereof driven by the said driving means, a distributor disc disposed below the bottom of the hopper, a distributor shaft extending from the said gear case downwardly through the hopper to the distributor disc, the said distributor shaft having a plurality of radially extending agitator members, a skid of substantially U-shape secured at its upper ends to the main frame ahead of and behind the hopper and extending downwardly below the said distributor disc, and bearing means secured on said skid for rotatably supporting the lower end of the distributor shaft.

8. In a device of the class described, a main frame, supporting means for engaging the tail gate of the truck box, a pivotal connection between the main frame and the supporting means, a distributor in the main frame, means mounted in the main frame for driving the distributor, a hopper in the main frame, the main frame including a semi-circular bar surrounding the units named in a horizontal plane, and a skid extending from the main frame in front of the assembly down beneath the distributor disc and affording a bearing for the distributor disc and back to the rear of the main frame.

ROY GADDIS.